United States Patent Office 3,474,910
Patented Oct. 28, 1969

3,474,910
COMPACT HIGH RATE FILTER
Joseph Schmerler, New York, and Robert A. Mendelow, Flushing, N.Y., assignors to Major Pool Equipment Corp., South Kearny, N.J.
Filed Sept. 30, 1966, Ser. No. 583,356
Int. Cl. B01d 35/02
U.S. Cl. 210—288                    5 Claims

ABSTRACT OF THE DISCLOSURE

A compact high rate filter operative with a pressure differential not more than three pounds. The filter comprises a tank having a tubular slit screen therein supporting a bed of sand about ten inches deep of a grain size between .40 and .55 mm. A perforated plate is disposed a distance above the bed to distribute the prefilt. The plate has perforations about one half inch in diameter and about two per square inch.

---

This invention relates generally to filters and, particularly, to compact high rate filters.

It is an object of the invention to provide a filter which can filter impurities from fluids, which are induced into the filter chamber at a high rate of speed, and can similarly discharge them at a high rate of speed.

It is another object of the invention to provide a filter construction in which the filtration materials are subjected only to minimal convection force by the fluid to be filtered, so that impurities are caused to penetrate gradually and uniformly through the filtration materials in depth.

It is yet another object of the invention to provide a high velocity filter having a construction which permits discharge of filtered fluids either from the bottom of the filter chamber, or from the top of the filter chamber.

It is yet another object of the invention to provide a compact high rate of flow filter, which may easily be purged of impurities entrapped in the filtration material, and restored to prime filtering efficiency.

It is also an object of the invention to provide a filter construction in which the backwash completely purges the filtration material of all impurities by reason of the dimensioned extent of the underdrain; a scouring action is attained.

It is yet another object of the invention to provide a filter construction, which maintains its filtration efficiency over prolonged periods of time and, in operation, is not characterized by turbulence of convection currents, which would disturb the filtration materials to such a degree as to cause excessive penetration of impurities through flow-channels.

It is also an object of this invention to efficiently filter with only a single grade of filtration material.

These objects and advantages, as well as other objects and advantages, may be attained by the device shown by way of illustration in the drawings in which.

Figure 1:
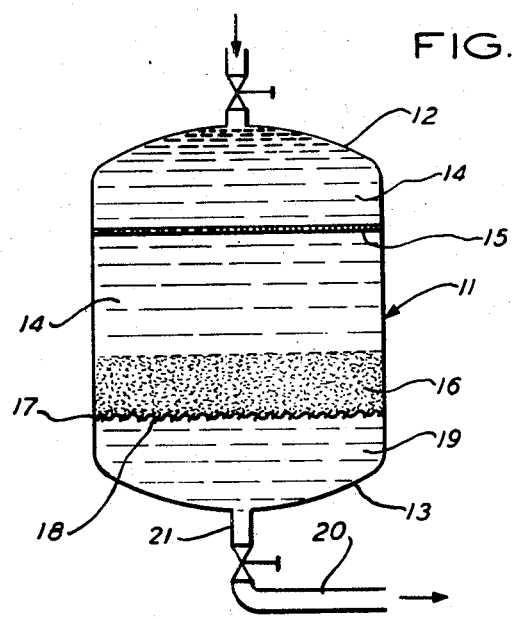
FIGURE 1 is a vertical sectional drawing showing the compact high rate filter having a bottom discharge passage.

In the past, in the filtration of water for swimming pools or for other purposes, it has been customary to have a chamber generally tubular in form with a convex dome and bottom. Water was introduced into the top of the chamber, and in order not to create too much turbulence in the chamber, a baffle was supplied to intercept the stream of water and to generally distribute the inflowing water over a wider area. In this manner, a jet stream was avoided. Since the introduction of water was at relatively low velocity, the filter was consequently of low capacity.

No problem of turbulence in the sand filtration material was experienced. The unfiltered water penetrated the sand, leaving behind solid material, and upon reaching the bottom of the chamber, the filtered water found an exit upwardly through a dished-head collector, which faced downwardly, and which had a mouth covered by a screen of such a degree of fineness as to normally keep the sand that had been stirred up by turbulence from entering the discharge-conduit. The discharge-conduit was connected to the dished-head, and conducted the filtered water from the chamber.

It was found desirable to have a higher capacity filter; i.e., a filter with a higher flow rate and increased capacity to hold and entrap impurities. In order not to stir up too much turbulence by increasing the rate of flow, this seemingly necessitated a much larger chamber, until it was discovered that a construction could be adopted which was no larger than the regular filter in size, but which accommodated a much greater rate of flow without creating turbulence. The problem was how to avoid excessive turbulence of the sand filtration material. If this occurred, it would lower the filter efficiency of the sand and permit rapid penetration of the filtered impurities through the sand, and then would discharge them into the presumably filtered water. Turbulence from the introduction of a high velocity jet, can be avoided by the construction following:

A generally tubular filtration chamber 11 with a convex top 12 and bottom 13 is provided. The fluid 14 to be filtered is introduced into the top at a relatively high velocity in the form of a jet. A brief distance below the convex top, a perforated plate 15 is affixed transversely across the body of the chamber 11. The perforated flat plate 15 is merely one embodiment of an acceptable diffuser, the exact form of which is not critical. Such diffuser means could take many other forms which would have the effect of breaking up a concentrated jet or stream into numerous smaller jets or streams. Examples of such forms would be: a concave perforated disc, a convex perforated disc, a perforated hemisphere placed opposite the fluid induction point, etc. The exact position of such perforated plate or diffuser is not entirely critical. It may be very close to the intake port at the top of the chamber. Its preferred position, however, is approximately one-quarter of the height of the chamber 11, measured as the distance from the top at which the plate is positioned in the chamber. If other positions are chosen, it is preferred that the plate should be not less than 8 inches above the filtration material hereinafter set forth. This plate functions as a multiple orifice diffuser with approximately two holes per square inch, each having a diameter of ½ inch. This has the effect of creating a considerable degree of turbulence above the plate, but reducing the velocity of the jet to a very high degree, so that instead of a high velocity single stream, the plate passes innumerable small streams of much less velocity toward and in the direction of the sand lying below the plate at the bottom part of the filter. Uniform distribution of flow toward the filtration material is accomplished. The convection of the fluid thus introduced through the perforated plate, is drastically reduced in velocity, so that when it reaches the layer of sand 16 (or the filtration material) in the chamber 11 approximately 10 inches deep (although the exact depth can be varied) there is no tendency to disturb the surface of the sand 16 but many of the impurities are slowly driven into the sand 16 in depth by the flow of the fluid through the sand 16. The sand is supported upon a stainless steel screen 17, having numerous offset slits 18; that is, slits 18 which do not progress in general perpendicularity through the screen, but are minute slits extending through the screen, in opposite directions by reason of a certain amount of rippling of the surface of the screen.

This product is available commercially as a "tubular slit screen." The fine size of the screen should be sufficient to retain the minimum size sand grain chosen. The screen is effective to support a layer of approximately 10 inches of sand allowing no amount of sand granules 16 to pass through the slits 18, and the fluid passing through the sand is of a relatively high degree of purity, being free of solid contaminants. The filtered water 19 from below the tubular slit screen 17 is withdrawn by a suitable pipe 20 or opening in the bottom filter body 11.

It is obvious that the sand of a suitable degree of coarseness must be used, otherwise too coarse sand will fail to retain the material filtered and too fine a sand might escape through the support. The filtration material is preferably sand. The grain size of the sand preferred is generally in the range of .40 to .55 mm. with a uniformity coefficient of 1.40 to 1.60. It has been found that sand of this character most efficiently performs its filtration purpose, and due to uniformity of the particle size, does not permit unequal penetration of impurities. Inevitably, fines (extremely minute grains of sand) are present in the sand to a slight degree. These fines can pass through the tubular slit screen but they do not. The reason that they do not is that before the filter is placed in operation, it is back-washed, thereby completely purging the fines from the sand.

The filter enables the induction of water at least four times the normal rate of flow permissible in conventional design filters, with a corresponding multiple increase in output. Prevailing acceptable standards of pressure drop are attained in the present filter when the filtration material is clean; in addition, to maintaining the specified augmented flow. Thus, eduction will not be attended by a pressure differential of more than three pounds less than induction.

Figure 2:
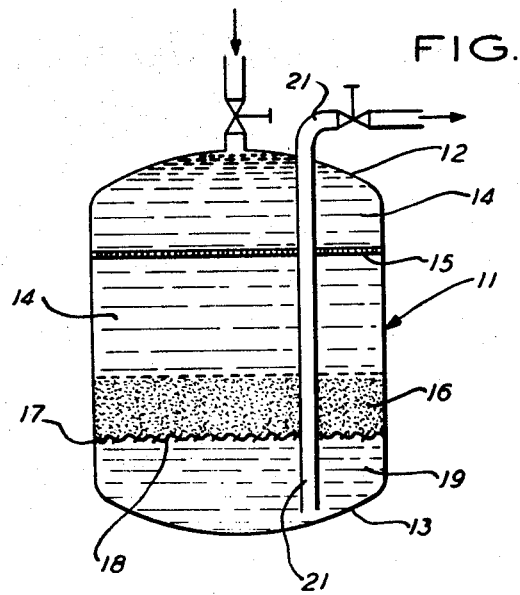
FIGURE 2 is a vertical sectional view showing the compact high rate filter having a top discharge passage.

In FIGURE 2, the filtered water, instead of being drawn from the bottom 13, is picked up by the pipe 21, which extends upwardly through the screen 17, the sand 16, the plate 15, and through the top 12.

By this construction a filter is provided, which has a high flow rate, and whose efficiency is extended because of the high flow being controlled, so as not to produce turbulence, and thereby permitting penetration of the sand filtration material.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. A filter comprising:
   (a) a chamber;
   (b) an inlet at the top of the chamber;
   (c) a perforated plate having perforations approximately one-half inch in diameter, and approximately two per square inch to diffuse a flow of liquid extending across the chamber below the inlet;
   (d) a rippled surface support screen with slits therethrough not perpendicular to the plane of the screen, defining a tubular slit screen;
   (e) filtration material disposed on the tubular slit support screen to a depth of approximately ten inches;
   (f) means to discharge a filtrate that has passed through the support screen from the chamber;
   (g) the filtration material having a grain size of approximately .40 to .55 mm. and a uniformity coefficient not greater than 1.60;
   (h) the tubular slit screen having a foramen size sufficient to retain the filtration material of the grain size selected;
   (i) the filtration accomplished at a pressure differential of not more than three pounds from induction to eduction.

2. A filter comprising:
   (a) the device according to claim 1,
   (b) in which the means to discharge is an outlet port in the bottom of the chamber.

3. A filter comprising:
   (a) the device according to claim 1,
   (b) in which the means to discharge is a conduit extending upwardly from the bottom of the chamber and out through the top of the chamber.

4. A filter comprising:
   (a) the device according to claim 1,
   (b) in which the top of the filtration material is disposed approximately eight inches below the bottom of the perforated plate.

5. A filter comprising:
   (a) the device according to claim 1,
   (b) in which the filtration material is unconfined, and gravitationally resting on the support screen in spaced relation to the bottom of the perforated plate.

References Cited
UNITED STATES PATENTS

| | | | |
|---|---|---|---|
| 605,152 | 6/1898 | Twitchell | 210—280 X |
| 2,033,533 | 3/1936 | Moore | 210—266 X |
| 2,176,549 | 10/1939 | Smith | 210—266 X |
| 2,841,286 | 7/1958 | Abos et al. | 210—288 X |
| 3,382,983 | 5/1968 | Stewart | 210—266 |

SAMIH N. ZAHARNA, Primary Examiner

U.S. Cl. X.R.

210—289